(12) United States Patent
Gronauer et al.

(10) Patent No.: US 10,401,208 B2
(45) Date of Patent: Sep. 3, 2019

(54) METER HOUSING MADE OF PLASTIC, IN PARTICULAR FOR A FLUID METER

(71) Applicant: DIEHL METERING GMBH, Ansbach (DE)

(72) Inventors: Christoph Gronauer, Pyrbaum (DE); Daniel Siegel, Bremerhaven (DE); Moritz Maier, Bremerhaven (DE); Nils Niebuhr, Bremerhaven (DE); Marvin Frank, Bremerhaven (DE)

(73) Assignee: Diehl Metering GmbH, Ansbach (DE)

( * ) Notice: Subject to any disclaimer, the term of this patent is extended or adjusted under 35 U.S.C. 154(b) by 421 days.

(21) Appl. No.: 15/390,856

(22) Filed: Dec. 27, 2016

(65) Prior Publication Data

US 2017/0108364 A1 Apr. 20, 2017

Related U.S. Application Data

(63) Continuation of application No. PCT/EP2015/001161, filed on Jun. 10, 2015.

(30) Foreign Application Priority Data

Jun. 25, 2014 (DE) ........................ 10 2014 009 441

(51) Int. Cl.
 *G01F 15/14* (2006.01)
 *E03B 7/07* (2006.01)
(52) U.S. Cl.
 CPC .............. *G01F 15/14* (2013.01); *E03B 7/072* (2013.01)

(58) Field of Classification Search
 CPC ................................ G01F 15/14; E03B 7/072
 See application file for complete search history.

(56) References Cited

U.S. PATENT DOCUMENTS

| 4,422,325 | A | 12/1983 | Sutherland et al. |
| D583,692 | S | * 12/2008 | Ball ............................. D10/96 |
| 2003/0140693 | A1 | 7/2003 | Hennebelle |
| 2004/0206175 | A1* | 10/2004 | Oeder ....................... G01F 1/10 |
| | | | 73/273 |
| 2015/0239428 | A1 | 8/2015 | Blum et al. |

FOREIGN PATENT DOCUMENTS

| CN | 201392222 Y | 1/2010 |
| CN | 202562547 U | 11/2012 |
| DE | 102007004826 A1 | 8/2008 |
| DE | 102012018477 A1 | 3/2014 |
| EP | 2713058 A1 | 9/2012 |
| GB | 2279064 A | 12/1994 |
| WO | 2009129885 A1 | 10/2009 |
| WO | 2013150430 A1 | 10/2013 |

* cited by examiner

*Primary Examiner* — David Z Huang
(74) *Attorney, Agent, or Firm* — Laurence A. Greenberg; Werner H. Stemer; Ralph E. Locher

(57) ABSTRACT

A plastics meter housing, in particular for a fluid meter, contains a bowl-like body having a base and a thereto adjoining annular wall having hollow connection pieces integrally formed thereon and leading into the interior of the body. On the outer side of the base are configured a plurality of ribs, which radiate from a center, branch and run to the base rim. On the outer side of the wall is a plurality of wall ribs which at least partially intersect and run over at least a part of the wall height.

19 Claims, 5 Drawing Sheets

METER HOUSING MADE OF PLASTIC, IN PARTICULAR FOR A FLUID METER

CROSS-REFERENCE TO RELATED APPLICATION

This is a continuation application, under 35 U.S.C. § 120, of copending international application No. PCT/EP2015/001161, filed Jun. 10, 2015, which designated the United States; this application also claims the priority, under 35 U.S.C. § 119, of German patent application No. 10 2014 009 441.3, filed Jun. 25, 2014; the prior applications are herewith incorporated by reference in their entirety.

BACKGROUND OF THE INVENTION

Field of the Invention

The invention relates to a plastic meter housing, in particular for a fluid meter, containing a bowl-like body having a base and a thereto adjoining annular wall having hollow connection pieces integrally formed thereon and leading into the interior of the body.

Meters are mostly used to register the flow of a liquid, for instance water, in order to determine a corresponding consumption. A meter usually consists of a meter housing, which is bowl-like in terms of its basic shape. Inserted in the meter housing is a measuring capsule, which has the actual components which are relevant to the measurement. For the insertion of the meter, on the meter housing there are provided corresponding connection pieces, which project therefrom and lead as hollow connection pieces into the interior of the housing, so that the fluid to be measured can flow in and out. The basic construction of such a meter is well known.

Such a meter housing is usually produced from brass, this by virtue of the fact that brass can be easily worked, exhibits no corrosion and is sufficiently stable. However, the relatively high weight of the metal meter housing is disadvantageous. Alternatively to a metal brass housing, it is also known to produce the meter housing from plastic. Such a meter housing is lighter in weight. Problems can arise in terms of stability, however, since the plastics material has a significantly lower compressive and tensile strength than brass. That is to say that the plastics material has a tendency to deform under pressure. Such compressive loads are also given, of course, in meter housings, since the fluid to be measured flows with sufficient pressure through the meter housing, or a corresponding nominal pressure in the region of several bars obtains. Furthermore, in the designing of the meter housing, allowance must also be made for corresponding overload pressures or extreme pressures, and hence for pressure peaks, which generally correspond to a multiple of the nominal pressure. For this reason, it is necessary to choose the wall thickness of the housing very large, since any deformation, in particular a mutual displacement of the connection pieces in one of the three spatial directions, must be avoided. This makes the housing, on the one hand, bulky, while, on the other hand, also relatively heavy again, so that, in the final analysis, advantages are barely given compared with the brass version.

SUMMARY OF THE INVENTION

The invention is thus based on the problem of defining a plastic meter housing which is improved in relation to the prior art.

In order to solve this problem, in a meter housing of the type stated in the introduction it is provided according to the invention that on the outer side of the base are configured a plurality of ribs, which radiate from a center, branch and run to the base rim, and on the outer side of the wall a plurality of wall ribs, which at least partially intersect and run over at least a part of the wall height.

The meter housing according to the invention is distinguished by a particular ribbed structure on the base as well as on the wall. Radiating from a center, a plurality of, for instance six, ribs run radially to the base rim, wherein the ribs preferably branch one or more times, as is discussed in further detail below. Depending on the arrangement of the connection pieces, the center can be disposed centrically on the circular base or eccentrically. It lies preferably on or close to the connecting line of the middle of the connection pieces. If the connection pieces are arranged symmetrically on the cylindrical body, thus on the maximum body diameter, then the "radial center" is also located preferably in the middle of the base. If the connection pieces are arranged slightly offset from the base middle, however, then the "radial center" is also arranged correspondingly eccentrically. The configuration of such a radial or star-shaped, preferably multi-branching, ribbed structure on the outer side of the base means that the stiffness can be significantly increased in this region, whereupon a relatively homogeneous stress distribution over the ribbed structure at given internal pressure is established. At high internal pressure, no deformation or bulging of the housing body ensues.

Apart from the specific ribbed structure on the base, the outer side of the wall also has a specific wall ribbed structure, which is respectively given on the free wall portions between the connection pieces. On the wall side are configured a plurality of wall ribs, which run more or less obliquely over the wall, thus extend over at least a part of the wall height and at least partially intersect. As a result of this specific "cross-ribbed structure", a diagonal stiffening between the connection pieces and the side walls is achieved, which is conducive to the torsional stiffness. A tensile or compressive load between the connection pieces is hereby also advantageously countered, and also a lateral deflection of the side walls is hereby prevented.

As a result of the interplay of the two specific base and wall ribbed structures provided according to the invention, a meter housing which is extremely stiff, both in terms of possible tensile and compressive loads and in terms of a torsional load, and which readily withstands even extreme pressure peaks, is thus obtained. The configuration of these specific structures means that the required volume of material can consequently be significantly reduced, and also the ribbed structure yields stiffness advantages compared with a rib-free housing configuration which is stiffened only by the large wall thickness. The housing is consequently improved in terms of its mechanical properties in relation to previously known plastics meter housings, and it can also be realized significantly lighter.

As described, the structure of the base-side ribs is distinguished by a radial or star-shaped basic shape. The ribs branch at least once en route to the base rim. This branching structure can be more or less symmetrical, in particular if the two connection pieces are disposed on the maximum diameter of the body and the radial center is centric to the base. However, if the connection pieces are slightly displaced relative to the base middle, and also the radial center relative to the base middle, then an asymmetrical branching profile, related to the respective base sides, can also be obtained.

Preferably, according to an expedient refinement of the invention, at least some of the base-side ribs, radiating from a central rib portion emanating from the center, branch for a first time into two diverging second rib portions, at least some of which in turn, for their part, branch for a second time into respectively two third rib portions. That is to say that some or all of the ribs branch twice, depending on whether, ultimately, a symmetrical or asymmetrical rib profile is given.

With regard to the stiffness, the height of the ribs likewise plays an important role. The maximum rib height must not be too low, yet should not exceed 25 mm. Preferably, the maximum rib height is about 15 mm, where appropriate also less, for instance 10 mm. This maximum rib height, at least in the region of the center, is given. This rib height can be maintained almost through to the base rim, yet preferably the height of at least some of the ribs, preferably, of course, all ribs, decreases toward the base rim. A somewhat arched basic shape of the ribbed structure, viewed in a side view, is thus obtained. In this case, it is expedient if the ribs have in the center region, over a certain rib length, a constant height, thus a plane which enables a mounting of the housing is hence more or less given.

The width of the ribs can be between 0.5 mm and 6 mm, preferably it will lie within the range of about 3-4 mm in order to facilitate production of the meter housing in an injection mold. The rib width can also change in the direction of the base rim, that is to say that the ribs, in particular the rib portions given by branching, become somewhat narrower toward the base rim. Despite everything, the stiffness remains given, since the base, toward the rim, because of the transition to the adjoining cylindrical wall, is in this region anyway substantially more pressure-resistant than in the region of the base middle.

In addition, it is expedient if on the base side are provided one or more connecting webs, which connect at least two ribs or rib portions and which lead to an additional bracing of the ribbed structure. Preferably, only two connecting webs, which run adjacent to the connection pieces, are provided. These can be of rectilinear construction, but they preferably run slightly arcuately, i.e. they follow the circular shape of the base rim to which they are adjacent. These connecting webs are expedient for the compensation of a torsional moment.

The wall ribs are preferably provided in the whole of the wall region between the two connection pieces. They serve in particular for the realization of a high torsional stiffness, which is realized by their diagonal or crossing arrangement. The height of the wall ribs should be a maximum of 15 mm, depending on the size of the housing it can also be a maximum of just 10 mm.

Here too, the height of at least some of the wall ribs can decrease toward the base, that is to say that, there too, a slightly arcuate structure, viewed in a side view, is obtained. The wall ribs arranged closer to the respective connection piece can also be somewhat taller than the more distantly arranged wall ribs, since, in particular in the region of the connection piece, a possible torsional moment can be given and, precisely there, a high torsional stiffness is expedient.

The width of the wall ribs should preferably be between 0.5 mm and 6 mm, and preferably lies within the range between 2 and 3 mm. The rib width can be equal over all the wall ribs, but it is also conceivable to construct the wall ribs close to the connection piece somewhat wider than the wall ribs remote from the connection piece.

The width ratio between the base ribs and the wall ribs can be configured according to application. The ribs can in principle be equal in width, but it is also conceivable for the respective rib width to differ, where appropriate also only in relation to individual ribs.

The meter housing itself is preferably an injection molded part made of a technical plastic, which preferably is filled. PPA or PA is herein preferred, though this list is not conclusive.

In addition to the meter housing itself, the invention further relates to a meter, in particular a water meter, containing a meter housing of the described type according to the invention. Apart from the meter housing, such a meter usually also contains a measuring capsule, which is inserted in the meter housing and serves to actually register the measurement values, as is well known.

Other features which are considered as characteristic for the invention are set forth in the appended claims.

Although the invention is illustrated and described herein as embodied in a meter housing made of plastic, in particular for a fluid meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
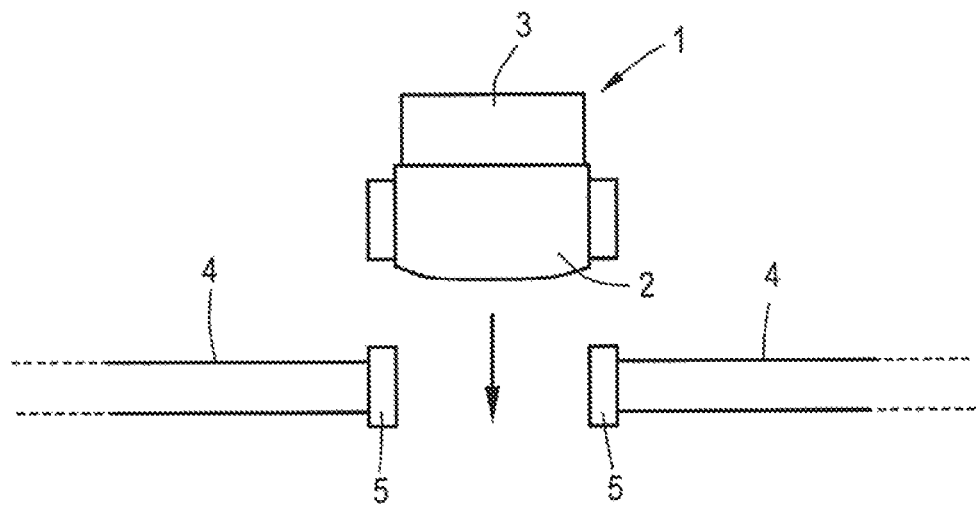
FIG. 1 is an illustration showing a basic representation of a meter according to the invention with a meter housing according to the invention, prior to its installation in a pipeline.

Referring now to the figures of the drawings in detail and first, particularly to FIG. 1 thereof, there is shown a basic representation of a meter 1 according to the invention. The meter 1 contains a meter housing 2 according to the invention in which is inserted a measuring capsule 3. The meter 1 is inserted via the meter housing 2 into a pipeline 4, in a manner which is known per se, for which corresponding pipe couplings 5 are screwed onto connection pieces of the meter housing 2, which latter is described in further detail below. The fluid to be measured, for instance water, flows through the pipeline 4 into the meter housing 2 and there to the measuring capsule 3, where the corresponding measurement values are recorded, and leaves the meter housing 2 via the second connected pipeline.

Figure 2:
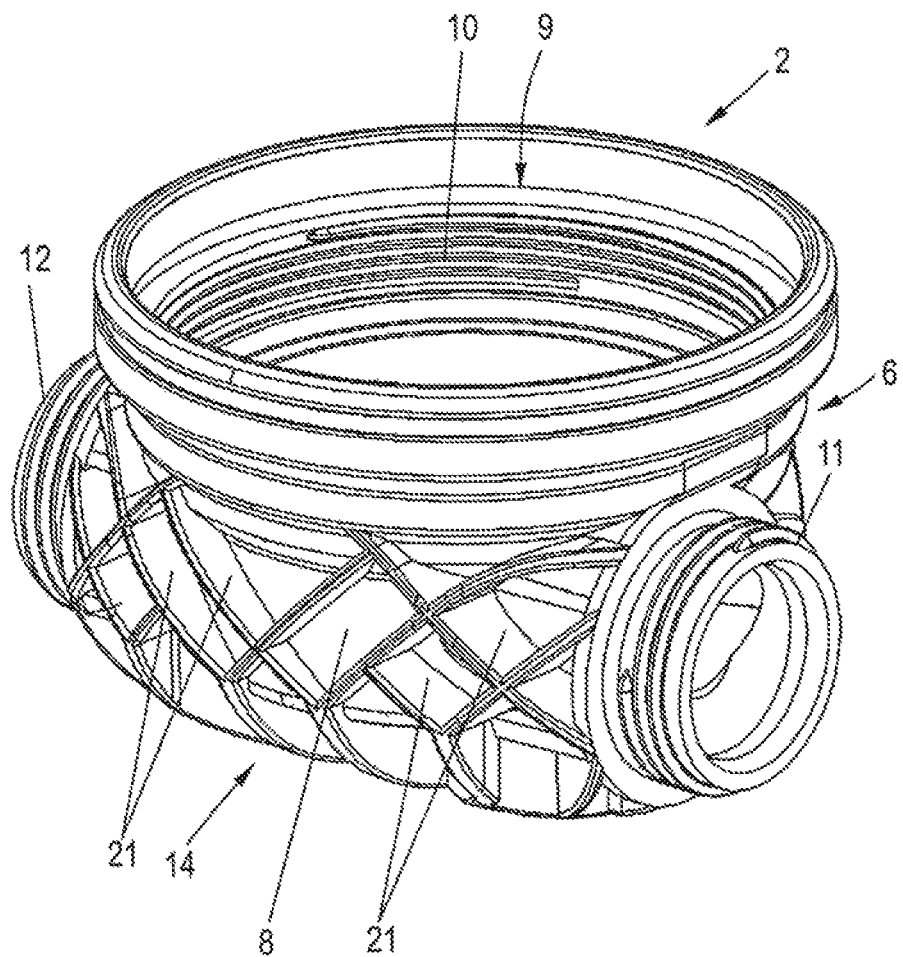
FIG. 2 is a diagrammatic, perspective view of the meter housing according to the invention, with a view from above into the meter housing.

FIG. 2 shows the meter housing 2 according to the invention in a detailed view. The meter housing 2 contains a bowl-like body 6, having a base 7 (see FIGS. 4 and 5) and a thereto adjoining annular wall 8. A hollow body having a receiving space 9, into which the measuring capsule 2 is inserted, is thus obtained. To this end, in the region of the upper, open body end is configured an internal thread 10, into which the externally threaded measuring capsule 3 is screwed.

On the body 6 are arranged on the wall side two connection pieces 11, 12, which are annular and hollow and lead into the interior of the body, i.e. the receiving space 9. Via the connection pieces 11, 12, onto which the pipe couplings 5 are screwed, the fluid makes its way into and out of the meter 1.

The meter housing 2 is a one-piece plastic component, which has preferably been produced in an injection molding process. Preferably, filled PPA or PA is used, though the choice of material is not restricted thereto.

The plastic meter housing 2 according to the invention is distinguished by a special ribbed structure 13 configured on the base 7, as well as a special wall ribbed structure 14 configured on the wall 8 and extending between the connection pieces 11 and 12.

Figure 5:
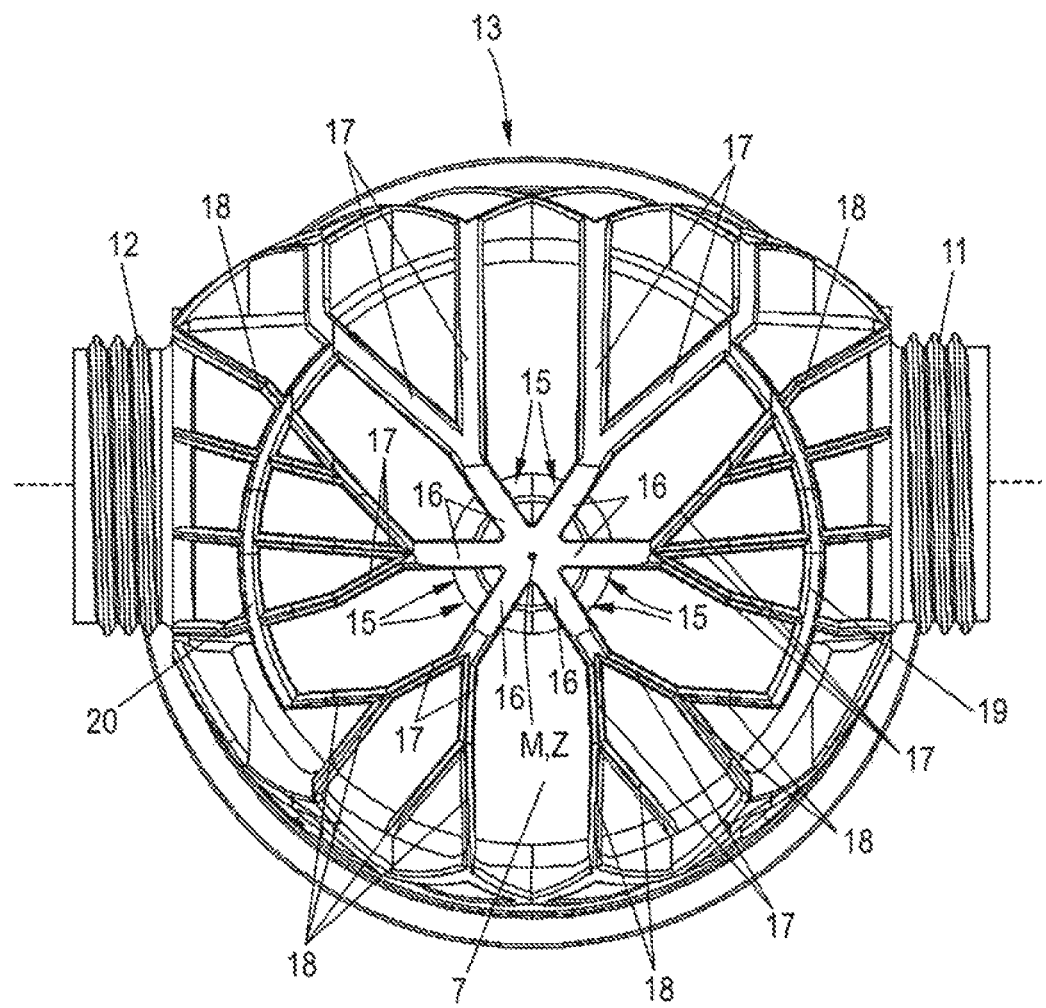
FIG. 5 is a bottom, side view of the meter housing.

The geometry of the base-side ribbed structure 13 is can best be seen from FIG. 5. In this, a view onto the base 7 is shown. From FIG. 5, it is firstly apparent that the two connection pieces 11, 12, which respectively have an external thread, are arranged offset from the middle M of the base 7 and of the body 6. The middles of the connection pieces are respectively defined by the dashed lines on the connection pieces 11, 12, so that the corresponding offset is clearly evident.

In the example shown, the base-side ribbed structure is distinguished by six ribs 15, which run radially, and at an equal angular distance apart, outward from a common center Z, which in the present illustrative embodiment coincides with the middle M of the base 7.

As FIG. 5 clearly shows, the ribs 15 branch one or more times. Each rib 15 runs with a central rib portion 16 radially outward from the center. The central rib portions 16 then branch into second rib portions 17, some of which (see FIG. 5), in terms of the rib width, are somewhat narrower than the rib portions 16. This is true of those rib portions 17, which, related to FIG. 5, emerge from the rib portions 16 of the four lower, central rib portions. The second rib portions 17 which emerge from the two upper rib portions 17 have substantially constant width.

As is further shown by FIG. 5, some of the second rib portions 17 branch for a further time into respectively third rib portions 18.

Figure 4:
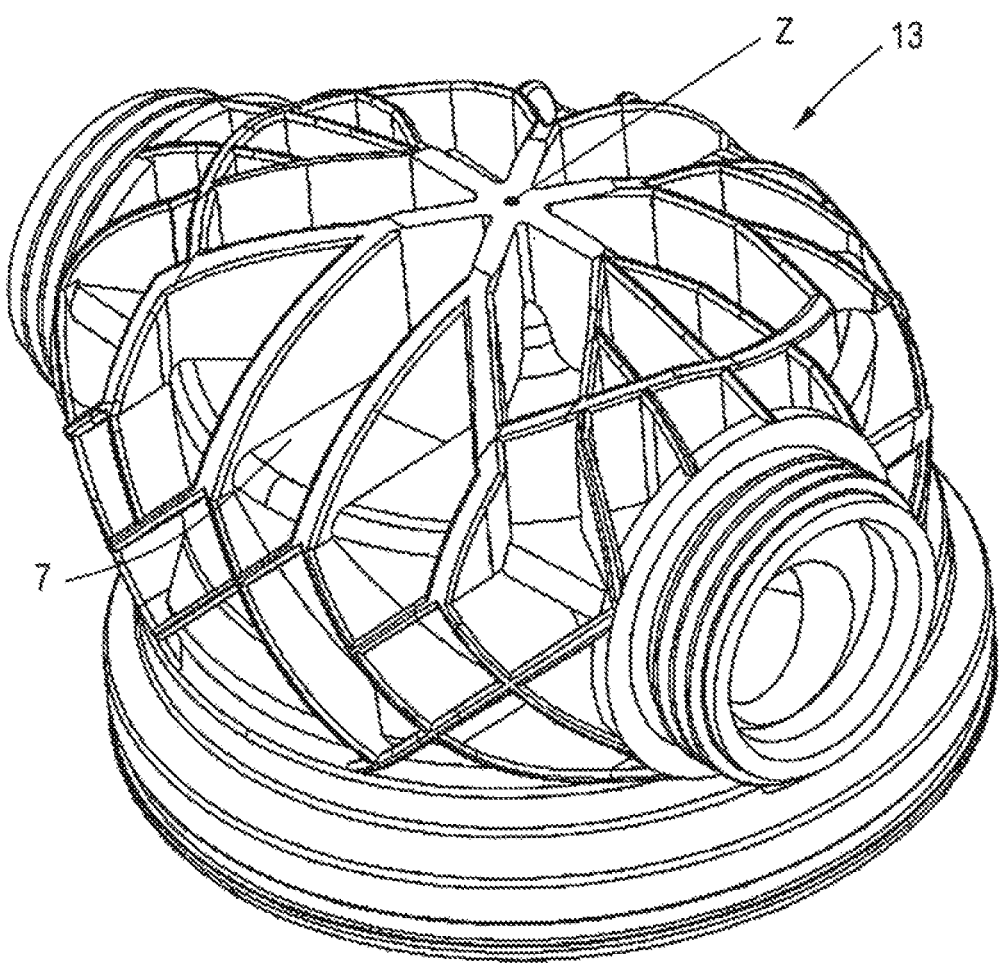
FIG. 4 is a perspective view of the meter housing from FIG. 2, with a view onto the bottom side of the meter housing.

The ribs 15 or the corresponding terminal rib portions 17 and 18 run through to the rim of the base 7 and merge in part into corresponding wall ribs, as becomes clear, for instance, from FIG. 4, which shows a perspective bottom view.

The height of the ribs 15 or of the rib portions decreases toward the rim of the base 7, as is shown, in particular, by FIG. 4. The central rib portions 16 have a constant height (see FIG. 4), so that a level base mounting surface is obtained around the center Z. The adjoining rib portions 17 and the, where appropriate, ongoing rib portions 18 reduce their height, however, so that, all in all, a curved geometry is obtained (see, in particular, FIGS. 3 and 6, which show an end view and a side view of the meter housing 2).

There are further provided two connecting webs 19, 20, which are of arcuate construction and ultimately follow the circular shape of the base 7. They are provided adjacent to the connection pieces 11, 12 and connect a plurality of ribs 15 or rib portions 17 and 18 one to another, as is clearly shown by FIG. 5. These connecting webs 19 absorb stresses in the event of torsional load and contribute to the torsional stiffness of the base 7. The shown ribbed structure 13 having the ribs radiating in a star shape from the center Z produces, for its part, a homogeneous stress distribution related to a given internal pressure inside the meter housing, so that bulging of the meter housing 2, even at high internal pressure, as can be given in the case of extreme pressure peaks, does not arise. The rib height also takes this into account. The ribs should have a height of maximally 25 mm, wherein the rib height naturally depends on the size of the meter housing 2 or of the connection width of the connection pieces 11, 12. The same applies to the rib width, which, depending on the design, should lie between 0.5 and 6 mm. Naturally, the corresponding dimensioning of the ribs with respect to height and width is also dependent on the anticipated pressure relationships in terms of nominal pressure, overload pressure and extreme pressure in relation to pressure peaks.

Figure 3:
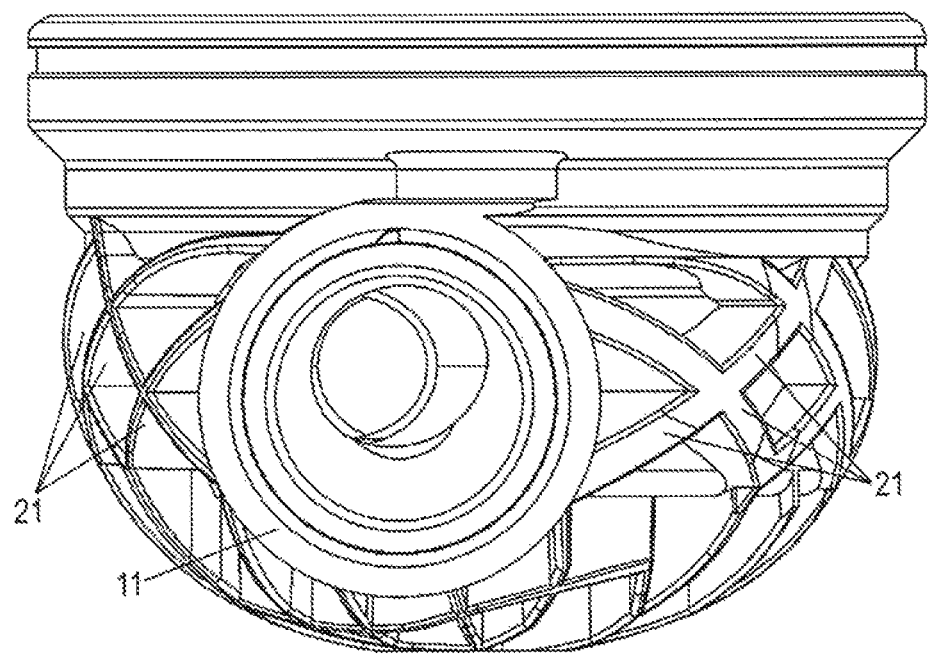
FIG. 3 is an end view of the meter housing from FIG. 2, with a view into a connection piece.
Figure 6:
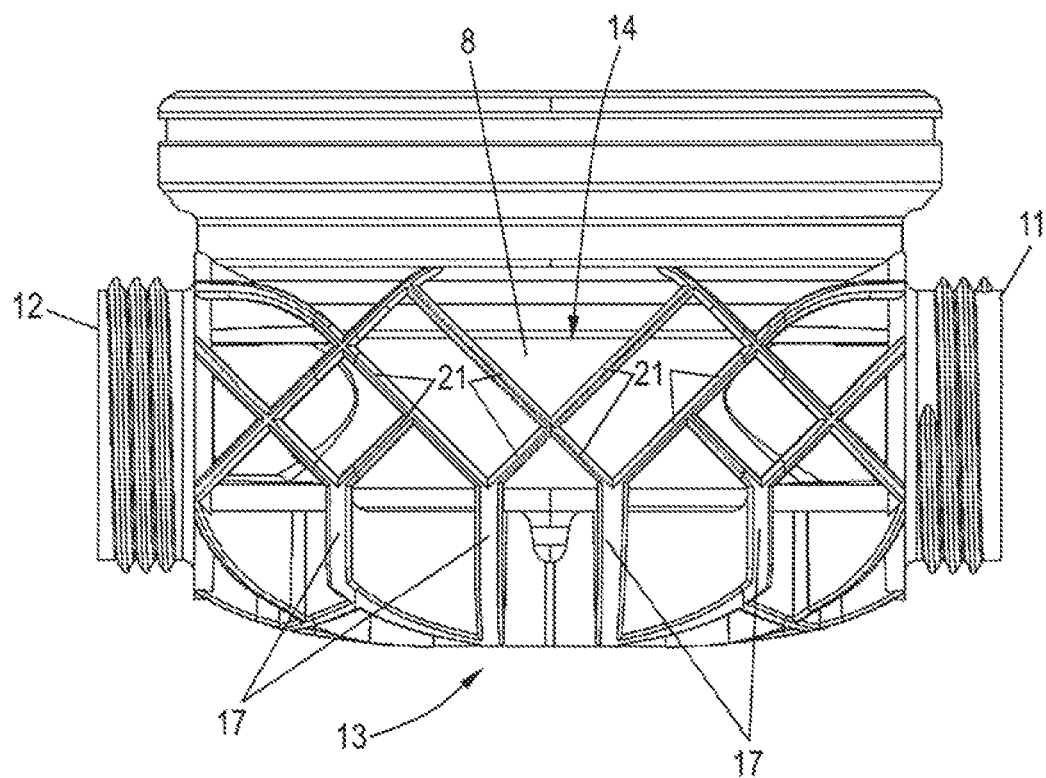
FIG. 6 is a side view of the meter housing.

Apart from the specific base-side ribbed structure 13, the meter housing 2 according to the invention also has a specific wall ribbed structure 14, as is evident, in particular, from FIGS. 2, 3 and 6. The wall ribbed structure 14 is formed by a plurality of substantially rectilinear wall ribs 21, which extend almost over the whole of the wall height into the region of the radial widening of the body 6 through to the upper, open end (see, in particular, FIG. 6). The wall ribs 21 run obliquely over the wall 8, so that they intersect accordingly, wherein wall ribs 21 which cross one another or connect to one another in a T-shape run preferably at an angle of 90° to one another, as shown by FIG. 6.

The wall ribbed structures 14 are provided on both sides of the connection pieces 11, 12 and extend through to these. As can be seen from the perspective view according to FIG. 2, the height of the wall ribs 21 can likewise vary somewhat over their length.

As FIG. 2 shows, the rib height can rise from the base-proximate region through to the upper rib end. The wall ribs 21 which run adjacent to the connection pieces 11, 12 and connect to these (see FIG. 2) can also be taller than the wall ribs 21 remote from the connection pieces.

Furthermore, the wall ribs which (see FIG. 3) on that wall side which is larger due to the asymmetric arrangement of the connection pieces 11, 12 can have a greater rib width than the wall ribs 21 provided on the opposite wall side. This becomes clear from FIG. 3.

Here too, the width of the wall ribs can be between 0.5 and 6 mm, depending on the dimensioning of the meter housing. It lies preferably within the range between 2 and 4 mm. The height of the wall ribs should maximally be 15 mm, though it preferably lies in the region of maximally 10 mm.

The wall ribs serve, in particular, to increase the torsional stiffness. Due to the diagonal arrangement of the wall ribs 21 and the realization of the corresponding rib junctions or of the corresponding rib pattern in conjunction with the linkage of the wall ribs or the guidance of the wall ribs through into the region of the connection pieces, the meter housing can be constructed such that it has extremely high torsional stiffness.

The transition of the wall ribs into the corresponding rib portions of the base-side ribbed structure 13 is also expedient, as can be seen in FIGS. 2, 5 and 6.

Due to the star-shaped or radial base ribbed structure provided according to the invention, and also the diagonal wall ribbed structure, the meter housing according to the invention has an extremely high stiffness. That is to say that the meter housing also withstands high tensile, compressive or torsional loads without significant deformation. Due to the rib arrangement and the rib geometry, load-induced stresses are low or widely reduced, and also a stress distribution which is as homogeneous as possible is given in the event of load. The connection of the wall ribs and of the base ribs makes an additional contribution to the stress homogeneity and stiffness. Finally, the meter housing can be produced using relatively little material, so that it has a relatively low weight.

The following is a summary list of reference numerals and the corresponding structure used in the above description of the invention:
1 meter
2 meter housing
3 measuring capsule
4 pipeline
5 pipe coupling
6 body
7 base
8 wall
9 receiving space
10 internal thread
11 connection piece
12 connection piece
13 ribbed structure
14 wall ribbed structure
15 rib
16 rib portion
17 rib portion
18 rib portion
19 connecting web
20 connecting web
21 wall rib

The invention claimed is:

1. A plastic meter housing, comprising:
a bowl-shaped body having a base and a thereto adjoining annular wall with hollow connection pieces integrally formed thereon and leading into an interior of said bowl-shaped body, said bowl-shaped body further having a plurality of base-side ribs disposed on an outer side of said base and said plurality of base-side ribs radiate from a center of said base, branch and run to a base rim, said bowl-shaped body further having a plurality of wall ribs disposed on an outer side of said annular wall, wherein said plurality of wall ribs at least partially intersect with each other and run over at least a part of a wall height.

2. The meter housing according to claim 1, wherein at least one of said base-side ribs, radiating from a central rib portion, branches for a first time into two diverging second rib portions, and at least one of said two diverging second rib portions branches for a second time into respectively two third rib portions.

3. The meter housing according to claim 2, further comprising at least one connecting web disposed on a base side, said at least one connecting web connects at least two of said base-side ribs.

4. The meter housing according to claim 3, wherein said at least one connecting web is one of two connecting webs which are disposed adjacent to said connection pieces.

5. The meter housing according to claim 4, wherein said two connecting webs run arcuately.

6. The meter housing according to claim 3, wherein said wall ribs are disposed in a whole of a wall region between two of said connection pieces.

7. The meter housing according to claim 1, wherein a height of said base-side ribs is maximally 25 mm.

8. The meter housing according to claim 1, wherein a height of at least one of said base-side ribs decreases toward said base rim.

9. The meter housing according to claim 1, wherein said base-side ribs have a width between 0.5 mm and 6 mm.

10. The meter housing according to claim 1, wherein said base-side ribs have a width which decreases toward said base rim.

11. The meter housing according to claim 1, wherein a height of said wall ribs is maximally 15 mm.

12. The meter housing according to claim 1, wherein a height of at least one of said wall ribs decreases toward said base.

13. The meter housing according to claim 1, wherein said wall ribs have a width that is between 0.5 mm and 6 mm.

14. The meter housing according to claim 1, wherein said wall ribs have a maximum width equal to or wider than a maximum width of said base-side ribs.

15. The meter housing according to claim 1, wherein at least one of said base-side ribs or and at least one of said wall ribs on said base rim merge directly into one another.

16. The meter housing according to claim 1, wherein the meter housing is an injection molded part made of polyphthalamide (PPA) or polyamide (PA).

17. The meter housing according to claim 1, wherein said bowl-shaped body is configured for receiving a fluid meter.

18. A meter, comprising:
a meter housing having a bowl-shaped body with a base and a thereto adjoining annular wall with hollow connection pieces integrally formed thereon and leading into an interior of said bowl-shaped body, said bowl-shaped body further having a plurality of base-side ribs disposed on an outer side of said base and said plurality of base-side ribs radiate from a center of said base, branch and run to a base rim, said bowl-shaped body further having a plurality of wall ribs disposed on an outer side of said annular wall, wherein said plurality of wall ribs at least partially intersect with each other and run over at least a part of a wall height.

19. A water heater, comprising:
a meter housing having a bowl-shaped body with a base and a thereto adjoining annular wall with hollow connection pieces integrally formed thereon and leading into an interior of said bowl-shaped body, said bowl-shaped body further having a plurality of base-side ribs disposed on an outer side of said base and said plurality of base-side ribs radiate from a center of said base, branch and run to a base rim, said bowl-shaped body further having a plurality of wall ribs disposed on an outer side of said annular wall, wherein said plurality of wall ribs at least partially intersect with each other and run over at least a part of a wall height.

* * * * *